Aug. 26, 1924.
C. B. WATERS
1,506,698
COMBINED SPOT OR BUTT AND ARC WELDER
Filed Feb. 4, 1924
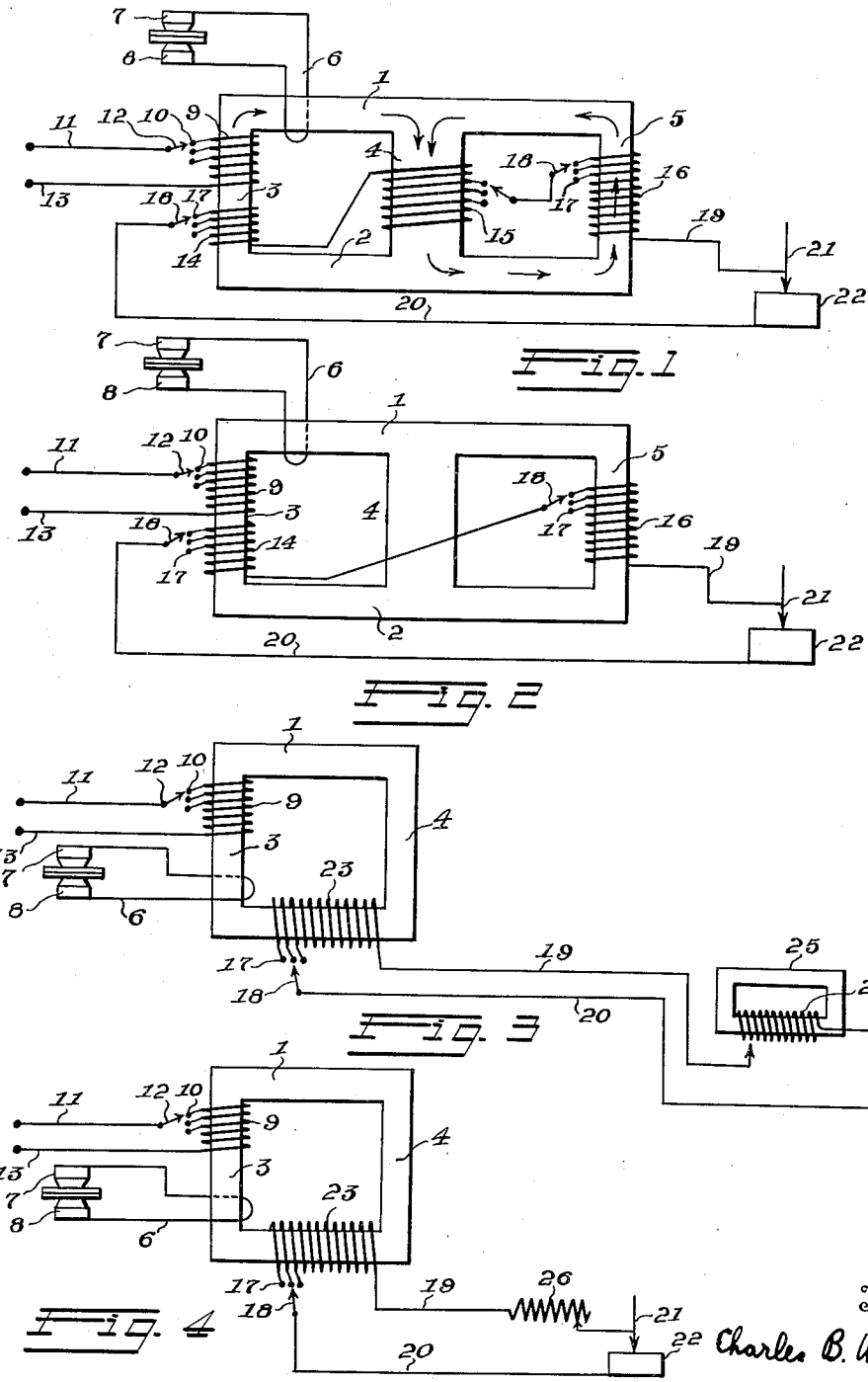
Inventor
Charles B. Waters
By William A. Strauch
Attorney Patented Aug. 26, 1924.

1,506,698

UNITED STATES PATENT OFFICE.

CHARLES B. WATERS, OF MONTCLAIR, NEW JERSEY.

COMBINED SPOT OR BUTT AND ARC WELDER.

Application filed February 4, 1924. Serial No. 690,491.

*To all whom it may concern:*

Be it known that CHARLES B. WATERS, a citizen of the United States, residing at Montclair city, in the county of Essex and State of New Jersey, has invented certain new and useful Improvements in Combined Spot or Butt and Arc Welders, of which the following is a specification.

The present invention relates to a spot or butt welding transformer arrangement which also is arranged to act as an arc welding transformer.

As is well known, spot and butt welding machines require heavy terminals for holding the work or pieces to be welded together, with means for forcing the work together and at the same time supplying a heavy current to the pieces as the pressure is applied. The current is usually supplied by a transformer of well known construction in which the primary winding is of many turns and adapted to be connected to commercial sources of alternating current while the secondary usually consists of a single turn of very heavy conductor.

Because of the nature of the work done it is essential that heavy machine parts for applying the pressures be used, and the result is that a great deal of iron, steel or other metal is used in the frame and working parts of certain types of such machines. In the butt and spot welders heretofore used the transformers have been such that magnetic leakage therefrom, although resulting in a slight heating of the surrounding parts, has not been sufficient in amount to seriously affect the operation of these machines. In factories where such work is done, frequent breakage of machinery occurs and it is very desirable that inexpensive means for performing arc welding operations to take care of these breakages should be provided. It is, however, now well known that successful arc welding transformers must have certain qualifications and regulating characteristics such as are inherent in leakage reactance transformers of the arc type Thomson transformers shown in U. S. Patents 400,515 and 400,516. These transformers, while suitable for arc welding, are provided with secondary arrangements which are wholly unsuitable for spot or butt welding. I have found, however, that it is possible, by properly proportioning the primary turns of such an arc welding transformer, a suitable secondary for spot or butt welding may be added. Because of flux leakage during the arc welding operation it is impractical to make a simple combined machine because of resultant heating of the metallic frame work. Proposals have been made to provide a combined machine, but these machines are nothing more than aggregations of well known forms of welding transformer windings in which each performs only its usual function unmodified by the other winding, and are impractical and inoperative because no means of providing for flux leakage is provided. The flux leakage during the arc welding operation in the prior proposed types of machines causes considerable heating of the surrounding iron spot and butt welding frame work and mechanisms, and this heating is so serious as to prevent practical operation. In operation of such proposed devices the heating due to leakage may cause a red heat to be reached in the surrounding parts, and is in all cases so great as to make the proposed aggregations inoperative.

The objects of the present invention are to provide new forms of transformers which may be used successfully for spot, or butt and arc welding, to provide special means for guarding against overheating of spot or butt welding iron framework and mechanism, to provide a cheap and efficient transformer of the character described; to provide new and improved forms of arc welding transformers; and such other objects as are attained in the embodiments of the invention hereinafter disclosed and of which—

Figures 1 to 4 are diagrammatic representations of various forms of the invention.

It is to be understood that the present invention contemplates the use of any well known spot or butt welding frame work and mechanism, in which the herein disclosed transformers are substituted for the transformers now in use. Since these specific mechanical features form no part of but are to be used in combination with the present invention, and the manner of combination will be obvious to one skilled in the art, no specific disclosure will be made, but the mechanical parts of the spot or butt welders will be indicated in diagram only.

Referring to Fig. 1, a closed magnetic core made up of yokes 1 and 2 and legs 3, 4 and 5 has a heavy single turn secondary loop 6 passed around the yoke between legs 3 and 4, or in any manner to be threaded by the primary flux. Loop 6 is connected to the spot or butt welding terminals of any well known form of such machines, as indicated in diagram by members 7 and 8. The amperage, demanded by the spot welding or butt welding operations being fixed, a primary winding 9 is applied to leg 3 and so designed as to supply the requirements of the loops 6 in operation. A plurality of taps 10 are brought out from winding 9 and are adapted to be connected to a conductor 11 by means of a movable switch arm 12. The other end of winding 9 is connected to a conductor 13. Conductors 11 and 13 lead to a source of alternating current power supply. Taps 10 and switch 12 give suitable regulation in the loop 6.

With the proportions of winding 9 fixed, auxiliary secondary windings 14, 15 and 16 are applied to legs 3, 4 and 5, respectively, and connected in series. Taps 17 and switch arms 18 are provided so that the number of turns in each winding may be varied according to the particular demands made on the auxiliary secondary circuit. Conductors 19 and 20 are provided to connect the auxiliary secondary with a welding electrode 21 and the work to be welded 22.

In practice, the sectional area of leg 4 is proportioned so that the flux density is low during the arc welding operation, and the windings 14, 15 and 16 are so applied that the flux induced by the secondary current will enter leg 4 and pass through it in the same direction as shown by the arrows. The number of turns in the coils 14, 15 and 16 are so proportioned that an arc potential of 12 to 35 volts and an open circuit voltage of 50 to 125 volts will be produced. A wide choice of relative turns of these windings is available to those skilled in the art, and is a matter of design for particular operating conditions to be met.

In operation as an arc welder substantially all of the leakage flux will pass through the transformer core and substantially no flux will pass into the surrounding metallic frame work or parts. In this manner heating is avoided and an effective and operative combination is provided.

Fig. 2 shows a modified form of the invention. In this form the winding 15 is eliminated and winding 16 is proportioned so as to perform the entire regulating functions for the arc welding secondary and it will be noted that this winding functions substantially as a pure inductance. The sensitiveness of regulation in this form is inferior to that shown in Fig. 1 but satisfactory arc welding may be performed. Leg 4 in this form is proportioned so that the leakage flux set up in the arc welding operation will pass therethrough instead of through the surrounding frame work and parts. In this way heating and interference with the operation of the spot and butt welding mechanisms will be avoided.

In Fig. 3 a form of the invention is shown in which an auxiliary winding 23 is applied on the core of the spot or butt welding transformer. Winding 23 is connected by means of lead 19 through an adjustable inductance 24 with a closed core 25 to electrode 21, and by means of taps 17, switch 18 and lead 20 to work 22. It is well known that an arc may be established by use of a transformer and a series inductance and the secondary constants are proportioned in accordance with well established principles to deliver a satisfactory arc. In this form of the invention a slag coated metallic electrode is preferably utilized and results in more satisfactory welding. Arc welding with the present arrangement results in substantially no flux leakage and the injurious heating of surrounding parts is therefore avoided. If desired leads 19 and 20 may be of sufficient length to remove core 24 from the immediate proximity of the surrounding frame work, and in this case core 25 may be open, but the provision of a closed core for this inductance obviates the necessity for removal and permits a compact arrangement. It is however to be understood that the use of an open magnetic core for inductance 24 is contemplated and within the scope of the invention and claims.

In Fig. 4 a resistance 26 is substituted for the reactance 24 of Fig. 3 and a heavily coated special metallic electrode is used in order to permit operation of the arc welding circuit.

Many other modifications and applications of my invention will suggest themselves to those skilled in the art and the invention is not limited to the embodiments disclosed but is to be limited in scope only by the terms of the following claims.

Having described preferred embodiments of my invention, what is desired to be secured by Letters Patent and claimed as new, is:

1. In combination, a metallic spot or butt welding frame work; a transformer closely associated with said frame work and comprising a primary winding, a spot or butt welding secondary winding, and an arc welding secondary winding; said transformer parts being so proportioned and arranged that substantially no exaggerated flux leakage occurs therein during arc welding operations; a metallic electrode and work to be welded connected in an arc welding circuit with said arc welding secondary winding; and regulating means connected in said arc welding circuit in a manner to permit a welding arc to be maintained between said electrode and work to be welded.

2. In combination, a metallic spot or butt welding frame work; a transformer closely associated with said frame work comprising a primary winding, a spot or butt welding secondary winding, and an arc welding secondary winding; said transformer parts being so proportioned and arranged that no exaggerated flux leakage occurs during arc welding operations; and an arc welding secondary circuit comprising said arc welding secondary winding, a coated metallic electrode, the work to be welded and a regulating resistance.

3. In combination, a metallic spot or butt welding frame work; a transformer closely associated with said frame work comprising a closed magnetic core, a common primary winding, a spot or butt welding secondary winding, and an arc welding secondary winding; said transformer parts being so proportioned and arranged that during arc welding operations no exaggerated flux leakage occurs from said transformer core into said frame work; and arc regulating means connected in series with said arc welding secondary winding.

Signed at New York city, N. Y., this 2nd day of February, 1924.

CHARLES B. WATERS.